US010569826B1

(12) United States Patent
Shaffir

(10) Patent No.: US 10,569,826 B1
(45) Date of Patent: Feb. 25, 2020

(54) MOTORCYCLE REAR-BRAKE ADAPTOR UNIT

(71) Applicant: Ambrosia Investments Ltd, Ramat Hasharon (IL)

(72) Inventor: Ram Shaffir, Ramat Hasharon (IL)

(73) Assignee: AMBROSIA INVESTMENTS LTD., Ramat Hasharon (IL)

( * ) Notice: Subject to any disclaimer, the term of this patent is extended or adjusted under 35 U.S.C. 154(b) by 0 days.

(21) Appl. No.: 16/416,240

(22) Filed: May 19, 2019

(51) Int. Cl.
| *B60R 3/02* | (2006.01) |
| *B62L 3/04* | (2006.01) |
| *B62K 19/38* | (2006.01) |
| *G05G 1/483* | (2008.04) |
| *B62K 23/08* | (2006.01) |
| *B62L 1/00* | (2006.01) |

(52) U.S. Cl.
CPC ............... *B62L 3/04* (2013.01); *B62K 19/38* (2013.01); *B62K 23/08* (2013.01); *B62L 1/005* (2013.01); *G05G 1/483* (2013.01)

(58) Field of Classification Search
CPC ............. B60R 3/02; B60R 3/007; B62J 25/00
USPC .......... 188/344; 180/219; 280/291, 293, 294
See application file for complete search history.

(56) References Cited

U.S. PATENT DOCUMENTS

| 5,476,162 | A | * | 12/1995 | Reed | ................. | B60T 11/16 188/344 |
| 5,673,597 | A | | 10/1997 | Lin | | |
| 5,779,254 | A | * | 7/1998 | James | ................. | B62J 25/00 180/219 |
| 6,332,258 | B1 | * | 12/2001 | Monson | ................. | B60T 7/06 29/401.1 |
| 6,719,316 | B1 | * | 4/2004 | Anthony | ................. | B62J 25/00 280/291 |
| 7,040,442 | B2 | * | 5/2006 | McWhorter | ............ | B62K 23/08 180/219 |
| 7,264,255 | B1 | * | 9/2007 | Winfrey | ................. | B62J 25/00 180/219 |
| 7,997,604 | B2 | * | 8/2011 | Griep | ................. | B62J 25/00 180/90.6 |
| 8,794,369 | B1 | | 8/2014 | Cruit | | |
| 9,010,793 | B1 | * | 4/2015 | Lindholm | ............ | B62K 23/08 280/291 |
| 9,187,042 | B2 | * | 11/2015 | Kuo | ................. | B62J 25/00 |
| 2005/0139434 | A1 | | 6/2005 | Nakaie | | |

FOREIGN PATENT DOCUMENTS

| CN | 102556023 A | 7/2012 |
| CN | 105015688 A | 11/2015 |

* cited by examiner

*Primary Examiner* — Christopher P Schwartz
(74) *Attorney, Agent, or Firm* — Mark S. Cohen; Pearl Cohen Zedek Latzer Baratz LLP

(57) ABSTRACT

An ergonomic motorcycle, rear-brake adaptor unit operative to provide constant and immediate accessibility to a rider whose foot is resting on a foot peg when riding in any of variety of riding postures that typically impede immediate access to the rear-brake pedal.

18 Claims, 12 Drawing Sheets

REAR-BRAKE ADAPTOR UNIT
LEVER EXTENSION EMBODIMENT
Perspective View

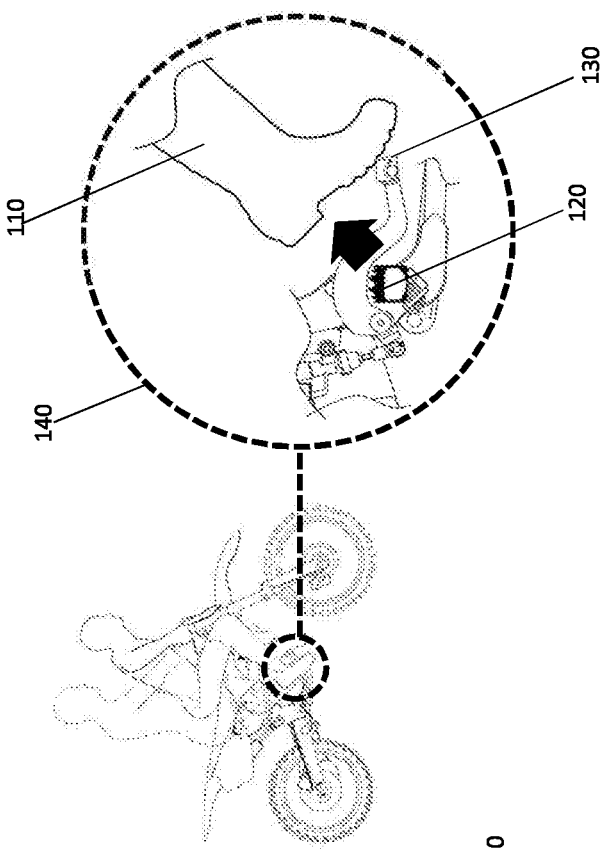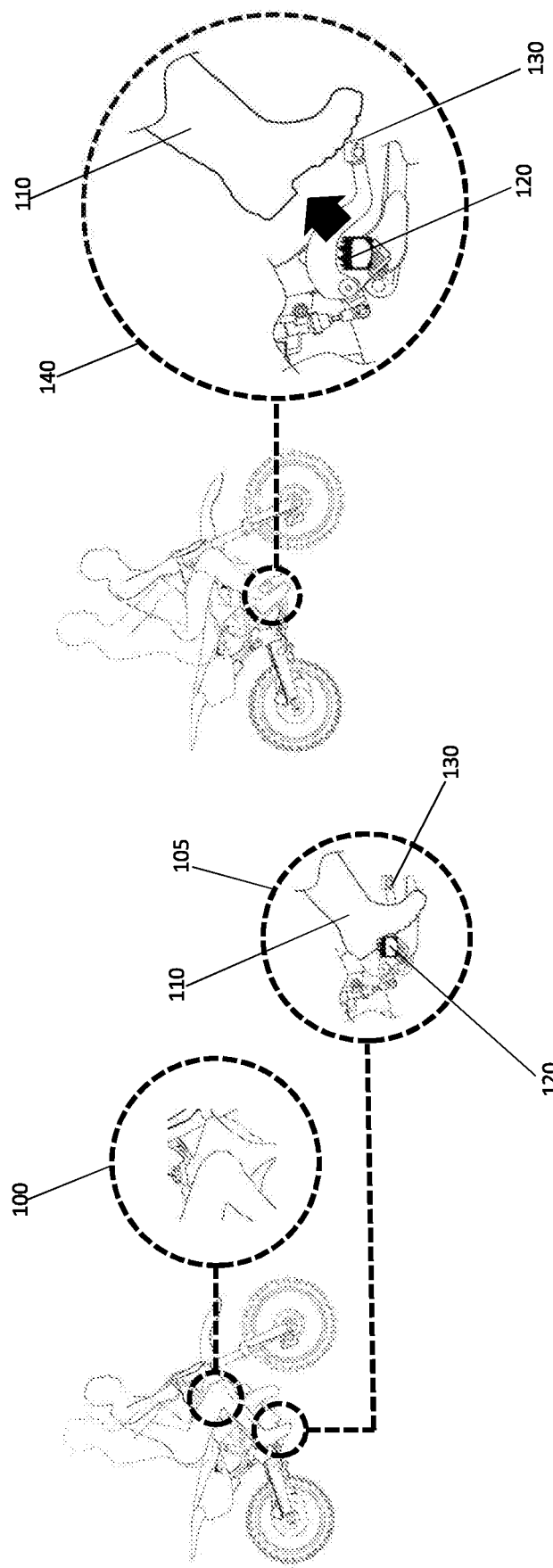

BRAKE PEDAL ACCESS
Wheelie Maneuver and Dual Riding

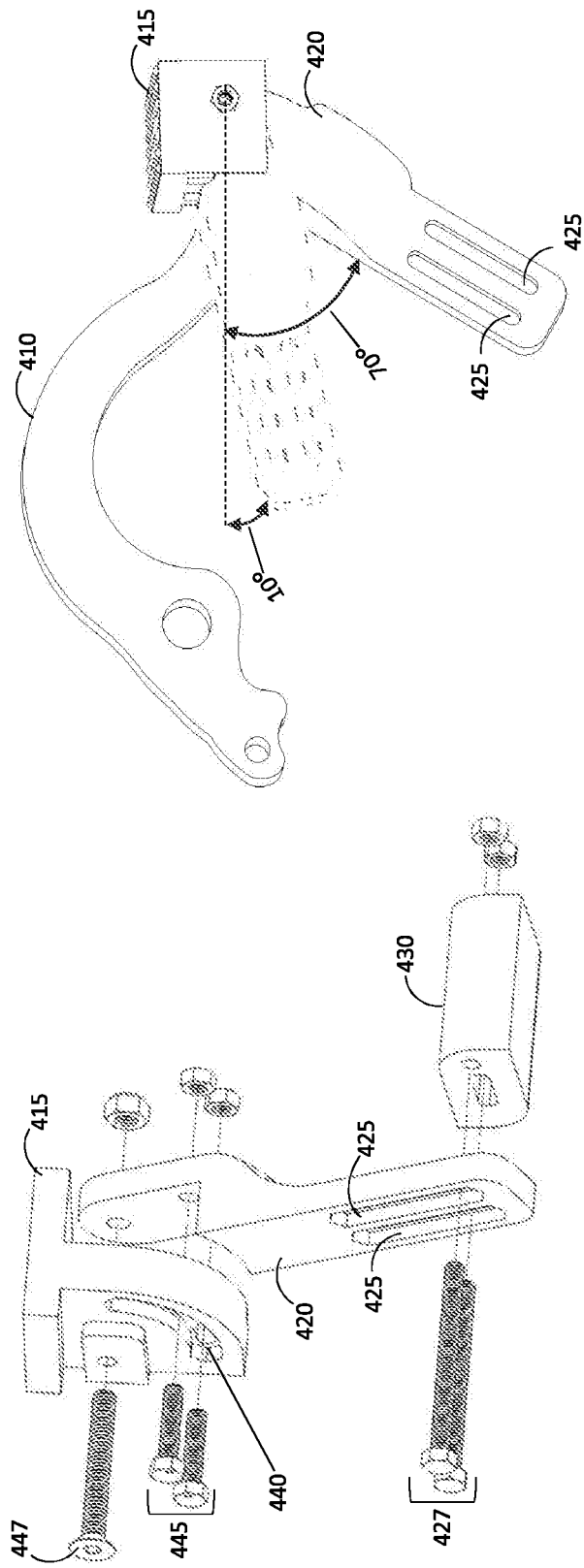

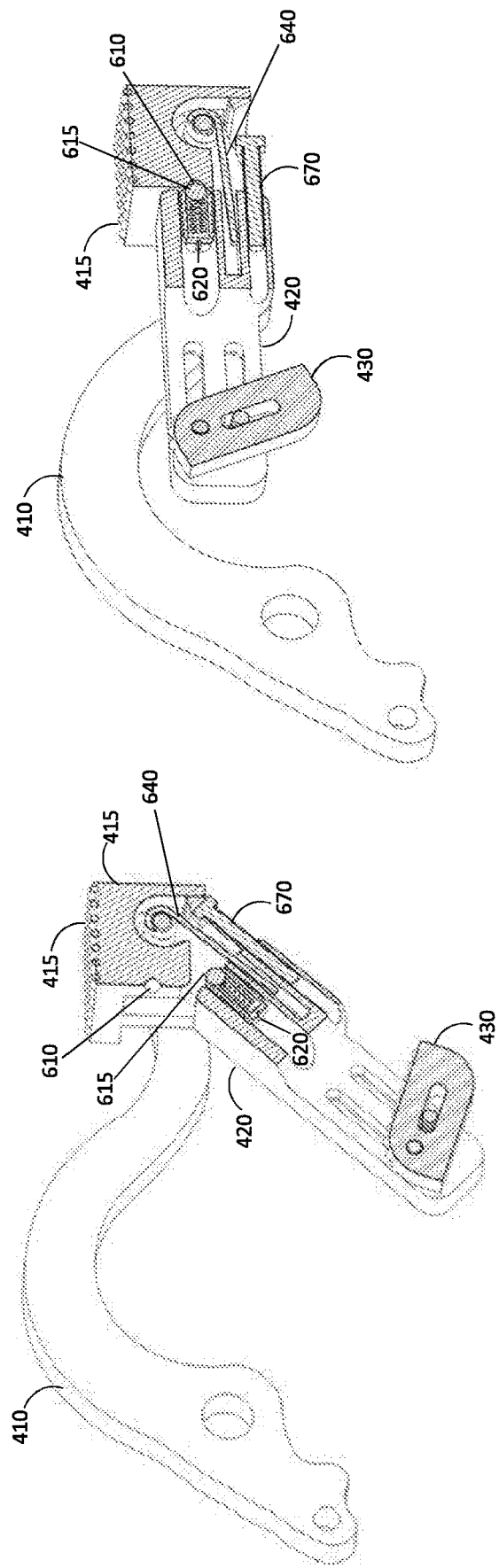

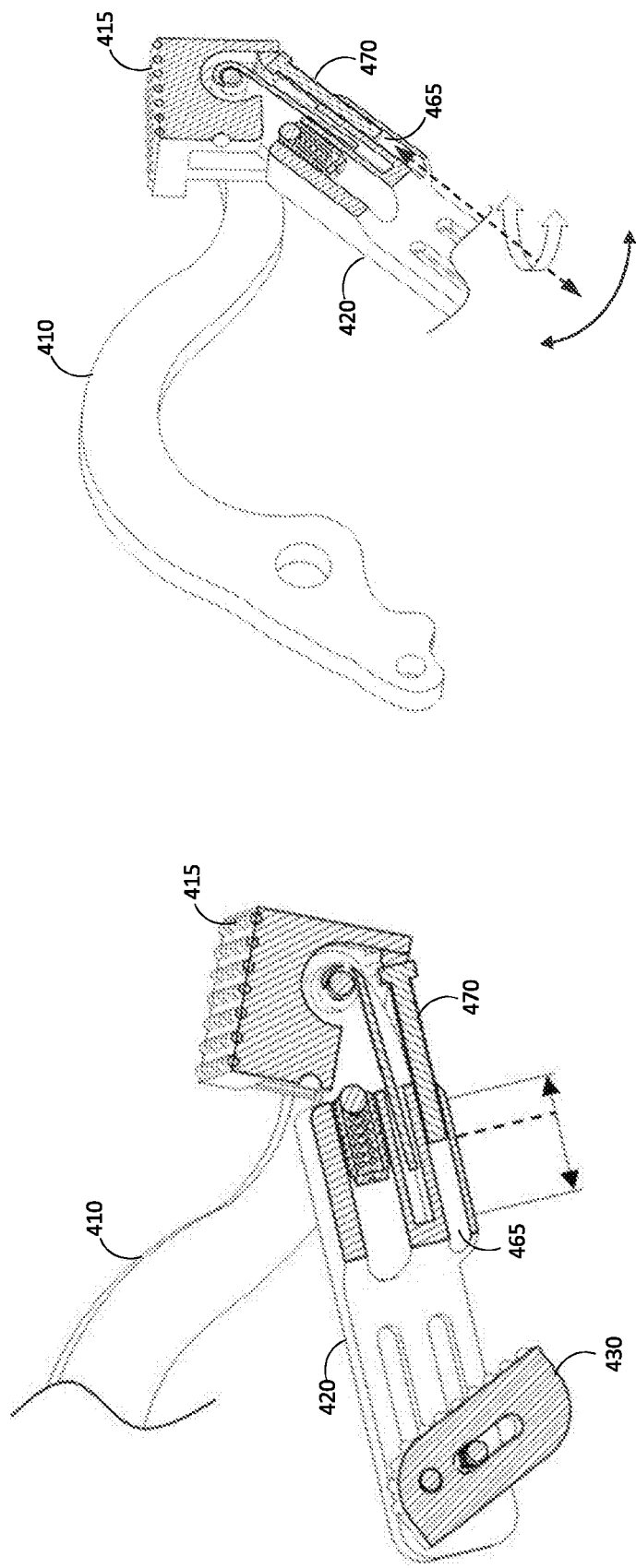

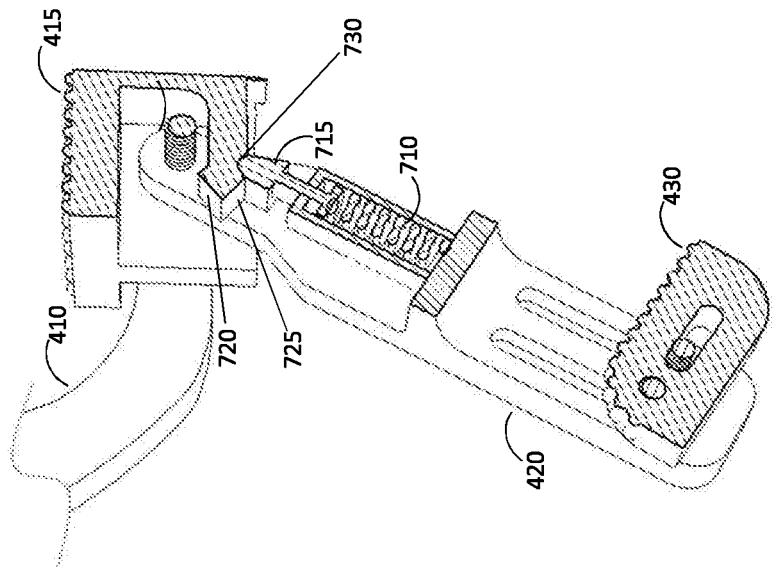
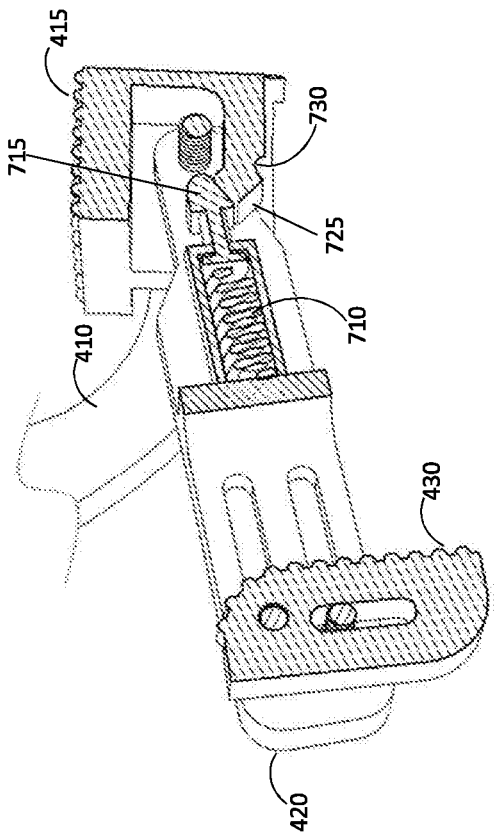
FIG. 7A
FIG. 7B

US 10,569,826 B1

MOTORCYCLE REAR-BRAKE ADAPTOR UNIT

BACKGROUND OF THE INVENTION

The current invention relates to rear braking in motorcycling; and particularly, to enhancing access to rear braking in all riding postures.

In many motorcycle riding postures, a rider must lift his foot from a foot peg to actuate rear braking with a right foot pedal. For example, riders positioned near the front of the seat, in an attack posture, or even in the center of the seat, in a normal riding posture, are compelled to place their foot on the foot peg at an orientation in which the natural range of ankle motion designed impedes quick and easy access to the step-plate. Accordingly, riders are further compelled to lift their foot from the foot peg and hold it above the step-plate to ensure quick access.

This lack of freedom of motion is frequently exacerbated by protective footwear commonly worn by riders. Current rear brake configurations not only cause rider discomfort and fatigue by causing a rider to hold the foot off the foot peg for uninterrupted access to the step-plate (brake pedal), they also facilitate accidents. In addition to the increase in braking time, the current configuration also promotes rider over brake when "hitting" the step-plate; whereas constant contact with the step-plate facilitates more accurate gaging of the degree of appropriate braking.

Therefore, there is a need to provide comfortable and easy access to rear braking for all riding postures to shorten response time.

SUMMARY OF THE INVENTION

According to the teachings of the present invention there is provided a motorcycle, rear-brake adaptor unit including: an adapted rear-brake lever in communication with a rear brake hydraulic master cylinder; a step-plate connected to the adapted rear-brake lever, the step-plate disposed in a position accessible to a downwardly sloping rider foot resting on a foot peg.

According to a further feature of the present invention, there is also provided an adapted step-plate having a connection configuration for receiving the adapted rear-brake lever.

According to a further feature of the present invention, the adapted rear-brake lever is implemented as a step-plate extension.

According to a further feature of the present invention, the step-plate extension is releasably mounted to the adapted step-plate so as to form an angle between 10°-70° relative to the horizontal.

According to a further feature of the present invention, the step-plate extension is releasably mounted to the adapted step-plate so as to form an angle between 20°-50° relative to the horizontal.

According to a further feature of the present invention, there is also provided a spring arrangement configured to bias the step-plate extension into a deployment position.

According to a further feature of the present invention, the spring arrangement includes a coil torsional spring arrangement configured to bias the step-plate extension into a deployment position.

According to a further feature of the present invention, there is also provided a detent mechanism configured to releasably secure the step-plate extension in a non-deployment position.

According to a further feature of the present invention, the spring arrangement includes a compression spring arrangement configured to bias the step-plate extension into either a deployment or a non-deployment state.

According to a further feature of the present invention, there is also provided a lower step-plate mounted to the lever extension, the lower step-plate securable in any one of a plurality of longitudinal positions within the step-plate extension.

According to a further feature of the present invention, wherein the lower step-plate is securable in any one of a plurality of orientations.

According to a further feature of the present invention, there is also provided a limiter bolt configured to define a maximum deployment angle of the step-plate extension.

According to a further feature of the present invention, the adapted rear-brake lever is implemented as a brake-lever extension.

According to a further feature of the present invention, there is also provided a lower step-plate mounted to the brake-lever extension, the lower step-plate securable in any one of a plurality of positions within the brake-lever extension.

According to a further feature of the present invention, the lower step-plate is operative to be secured in any one of a plurality of orientations.

There is also provided according to the teachings of the present invention, a motorcycle, rear-brake adaptor unit including, a motorcycle rear-brake lever in communication with a rear master brake cylinder; a step-plate mounted to the motorcycle rear-brake lever;

a lever extension integrally connected to the motorcycle rear-brake lever; and a lower step-plate mounted to the lever extension, the lower step-plate disposed in a position accessible to a downwardly sloping rider foot resting on a foot peg.

According to a further feature of the present invention, the lower step-plate is securable in any one of a plurality of positions within the lever extension.

According to a further feature of the present invention, the lower step-plate is securable in any one of a plurality of orientations.

BRIEF DESCRIPTION OF THE DRAWINGS

The subject matter regarded as the invention is particularly pointed out and distinctly claimed in the concluding portion of the specification. The invention is best understood in view of the accompanying drawings in which:

FIG. 1A is a schematic depiction of knee and foot posture during natural/attack position;

FIG. 1B is a schematic depiction of an unsustainable foot posture enabling access to the brake pedal necessitated by riding in the natural or the attack positions of FIG. 1A;

FIG. 5A is a schematic, perspective side-view of a connection configuration of the step-plate extension of FIG. 4 to the upper step-plate, according to an embodiment;

FIG. 5B is a schematic, side-view of the connection configuration of FIG. 4, depicting a range of angles at which step-plate extension can be configured to facilitate rider needs; according to an embodiment;

FIGS. 6A-6B are schematic, perspective cross-sectional side-views of a retractable step-plate extension in deployed and non-deployed states, respectively; according to a torsion spring embodiment;

FIGS. 6C-6D are schematic, cross-sectional perspective cross-sectional side-views of the step-plate extension depicting a limiter bolt operative to define a deployment angle in accordance with rider needs; according to a torsion spring embodiment, FIGS. 7A-7B are schematic, perspective side-views of a retractable step-plate extension in deployed and non-deployed states, respectively; according to a compression spring embodiment.

Figure 3:
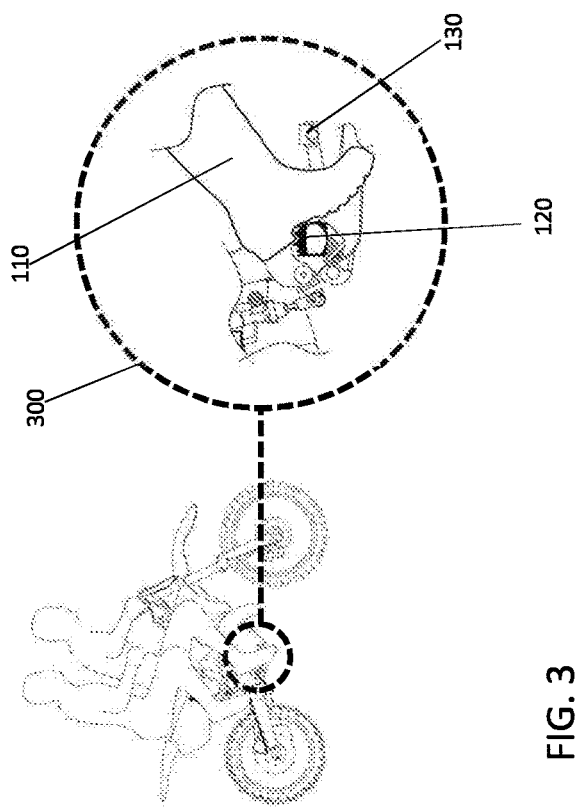
FIG. 3 is a schematic depiction of foot posture during dual riding.

It will be appreciated that for the sake of clarity, elements shown in the figures may not be drawn to scale and reference numerals may be repeated in different figures to indicate corresponding or analogous elements.

DETAILED DESCRIPTION OF THE PRESENT INVENTION

In the following detailed description, specific details are set forth in order to facilitate understanding of the invention; however, it should be understood by those skilled in the art that the present invention may be practiced without these specific details. Furthermore, well-known methods, procedures, and components have not been omitted to highlight the invention.

The present invention is an ergonomic motorcycle rear-brake adaptor unit facilitating access to the rear brake pedal for riders in all riding postures.

Turning now to the figures, FIGS. 1A-1B depict a rider in a natural/attack posture. As shown, in close-ups 100 and 105, the rider is compelled to position the foot underneath rear-brake step-plate 130 at a downward angle between 20°-30° relative to the horizontal while the foot rests on foot peg 120. Stepping on step-plate 130 from such foot posture is a physiologically difficult, if not impossible, task because foot access to step-plate 130 can easily exceed a 20° dorsiflexion limit. The thick protective boots 110 further inhibit ankle motion to the point that a rider must assume an impossible foot posture above step-plate 130 as shown in close up 140 of FIG. 1B. It should be appreciated that these braking impediments also exist when a rider is seated in a normal riding position in the middle of the seat, as noted above.

Figure 2:
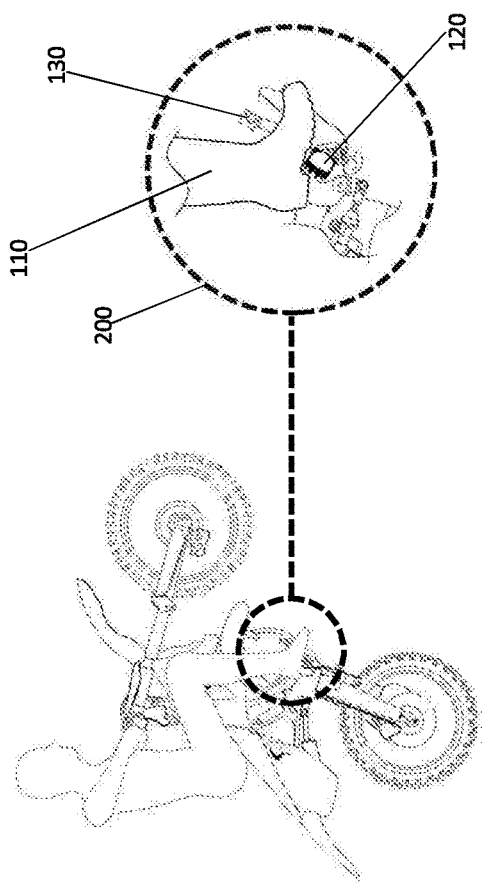
FIG. 2 is a schematic depiction of foot posture during a wheelie maneuver.

FIG. 2 is a schematic depiction of foot posture during a wheelie maneuver. As shown in close-up 200, during the maneuver foot position naturally assumes a position underneath step-plate 130. The absence of instantaneous, rear brake control means there is a very high risk of flipping the motorcycle backwards and causing injury or even endangering life.

FIG. 3 depicts a dual rider scenario in which the front rider is sitting in a position shifted to the front of the seat thereby creating the foot posture non-conducive to complete rear brake control, as shown in close-up 300.

Figure 4:
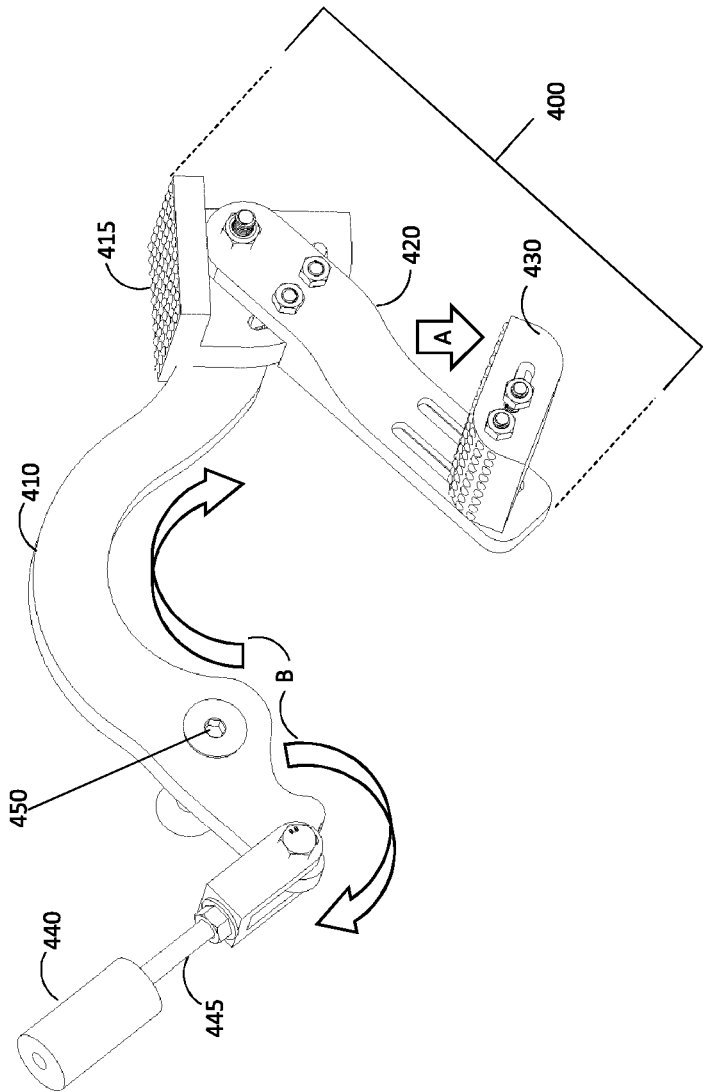
FIG. 4 is a schematic, perspective side-view of a pivotally-mounted, rear-brake adaptor unit, implemented as a step-plate extension.

FIG. 4 is a schematic, perspective side-view of an ergonomic, motorcycle rear-brake adaptor unit 400 including an adapted rear-brake lever implemented as a step-plate extension 420, an adjustable, lower step-plate 430 and an adapted step-plate 415, according to an embodiment. As shown, adapted step-plate 415 interfaces with the distal end of brake lever 410 pivotally mountable to a bike frame (not shown) at revolt joint 450. Lever 410 is linked to hydraulic master cylinder 440 through push rod 445.

In operation, foot pressure A applied to lower step-plate 430 rotates lever 410 rotation B and drives push rod 445 into cylinder 440 as if the pressure was applied to upper step-plate 415 thereby advantageously providing rear braking capacity from two possible foot positions found in various riding postures.

FIGS. 5A-5B are schematic, perspective side-views of a connection configuration of step-plate extension 420 with adapted step-plate 415, according to an embodiment. As shown, step-plate extension 420 is mounted to adapted plate 415 though bolt 447 and secured with bolts 445 at any chosen angle between 10° to 70° relative to the horizontal, as depicted in FIG. 5B, to facilitate rider needs. It should be appreciated that in a certain embodiment step-plate extension 420 is connectable to brake lever 410 directly.

Lower step-plate 430 is rotatable and slidably mounted to step-plate extension 420 by way of parallel grooves 425 and secured at the desired height in grooves 425 at the desired orientation by way of bolts 427.

It should be appreciated that other connection configuration means providing functionality of bolts 445, 427 and grooves 440 and 425 are also included within the scope of the present invention.

FIGS. 6A-6B are schematic, perspective, cross-sectional side-views of a retractable embodiment of step-plate extension 420 in deployed and non-deployed states, respectively, according to a torsion spring embodiment.

As shown, step-plate extension 420 is fitted with a spring arrangement operative to retract step-plate extension 420 when needed and recoil into a deployment position. The spring arrangement 640 in which the spring coil is anchored in the body of upper step-plate 415 and biased to drive step-plate extension 420 into a deployment angle defined by limiter bolt 470 as will be further discussed. Step-plate extension 420 includes a detent mechanism that in a certain embodiment includes an embedded plunger spring 620 driving an engagement ball 615 disposed in a sleeve such that ball 615 locks into a corresponding spherical catch 610 disposed in the body of upper plate 415.

As noted above, step-plate extension 420 is not permanently fixed at a deployment angle to advantageously enable step-plate extension 420 to rotate upwards toward brake lever 410 responsively to impact with obstacles, or the road during sharp banking, and recoil into a deployment angle. When upward rotation achieves a threshold angle, engagement ball 615 is captured by spherical catch 610 thereby releasably securing extension 420 in a substantially horizontal, non-deployment position until the rider unlocks the detent by pushing step-plate 430 downwards sufficiently to release plunger engagement ball 615 from spherical catch

610. After release, torsion spring 640 drives step-plate extension 420 into a deployment angle.

In another variant embodiment, the coil portion of the torsion spring arrangement 640 is anchored in step-plate extension 420. Additionally, in a certain variant embodiment the biasing spring of plunger engagement ball 615 is disposed in the body of upper step-plate 430 and catch 610 is disposed in step-plate extension 420. It should be appreciated that other types of detent mechanisms are included within the scope of the present invention.

FIGS. 6C-6D are schematic, perspective cross-sectional side-views of step-plate extension 420 having a deployment angle limiter bolt 470 defining an angle of deployment. As shown, limiter bolt 470 is disposed in a threaded sleeve 465 and advances or regresses in sleeve 465 depending on rotation direction. Abutment of limiter 470 on the body of upper pedal 415 defines a deployment angle of step-plate extension 420.

In another embodiment, deployment angle limiter 470 is configured to advance in predefined segments in the absence of threading. In another embodiment, limiter 470 is set into the body of adapted upper step-plate 415 and abuts on step-plate extension 420 to define maximum deployment angle.

FIGS. 7A-7B are schematic, cross-sectional perspective side-views of variant embodiment of the spring arrangement of a retractable step-plate extension 420 in deployed state and a non-deployed state, respectively; according to a compression spring embodiment.

As shown, step-plate extension 420 is fitted with a compression spring 710 configured to bias plunger 715 into a state of abutment with surfaces 730. When plunger 715 is in abutment with upper surface 720 step-plate extension 420 is releasably secured in a non-deployment position whereas when in abutment with lower surface 725, plunger 715 is driven downward until plunger 715 is releasable secured in catch 730 where step-plate extension 420 assumes a deployment position.

In this variant embodiment, step-plate extension 420 is not permanently fixed in a deployment angle to advantageously enable step-plate extension 420 to rotate upwards responsively to impact with obstacles during travel and recoil into a deployment angle. When upward rotation achieves a threshold angle between 10°-15° relative to the horizontal, plunger 715 will be driven past an angle of abutment with surface 725 and assume a substantially horizontal, non-deployment position until the rider releases plunger engagement by pushing lower step-plate 430 downwards.

It should be appreciated that in certain embodiment, spring arrangement is implemented with one or more tension springs, a leaf spring, a bistable spring, or other biasing elements providing such functionality.

Figure 8:
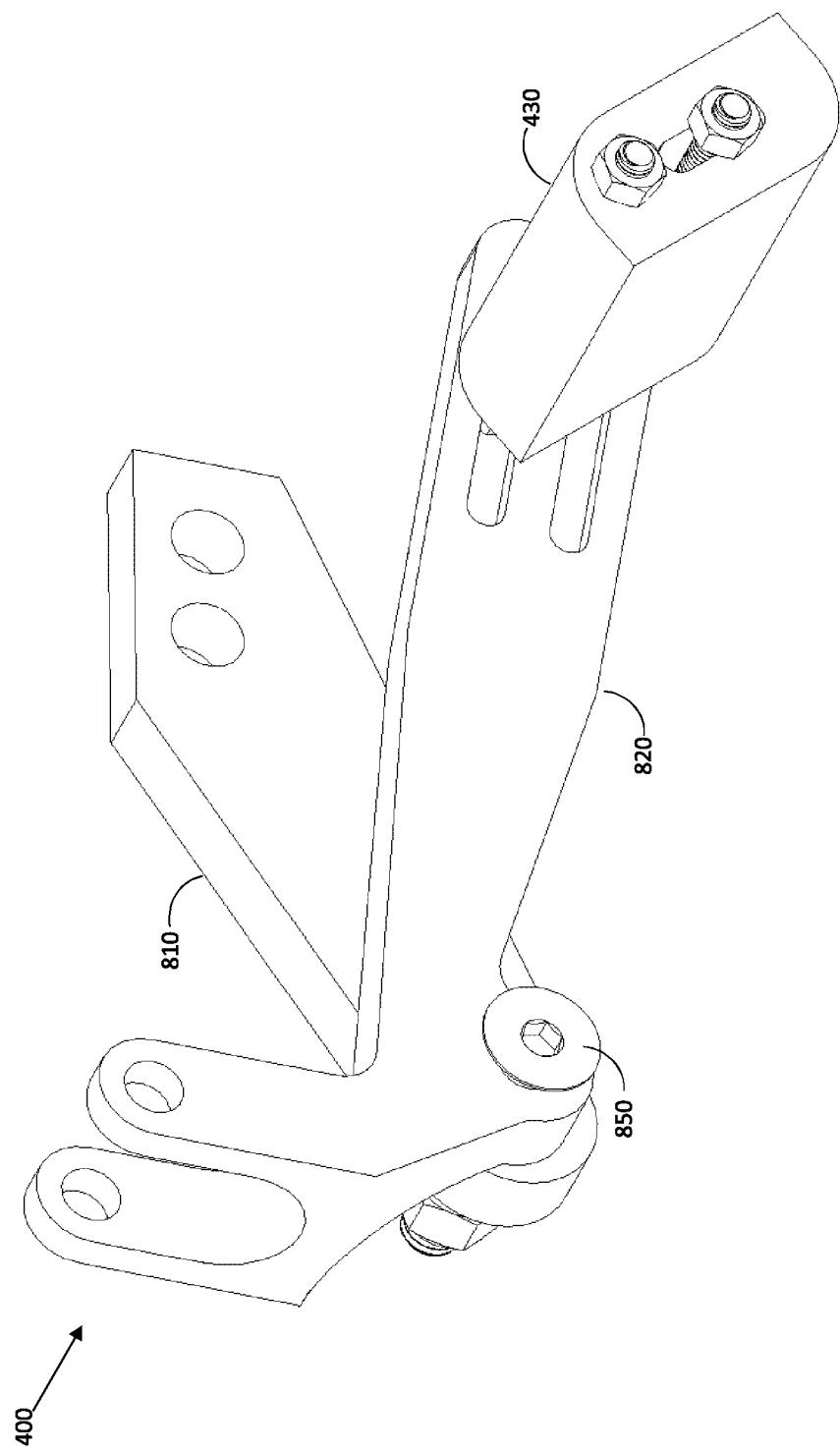
FIG. 8 is a perspective side-view of a motorcycle rear-brake adaptor unit implemented as a brake-lever extension; according to a second embodiment.
Figure 9:
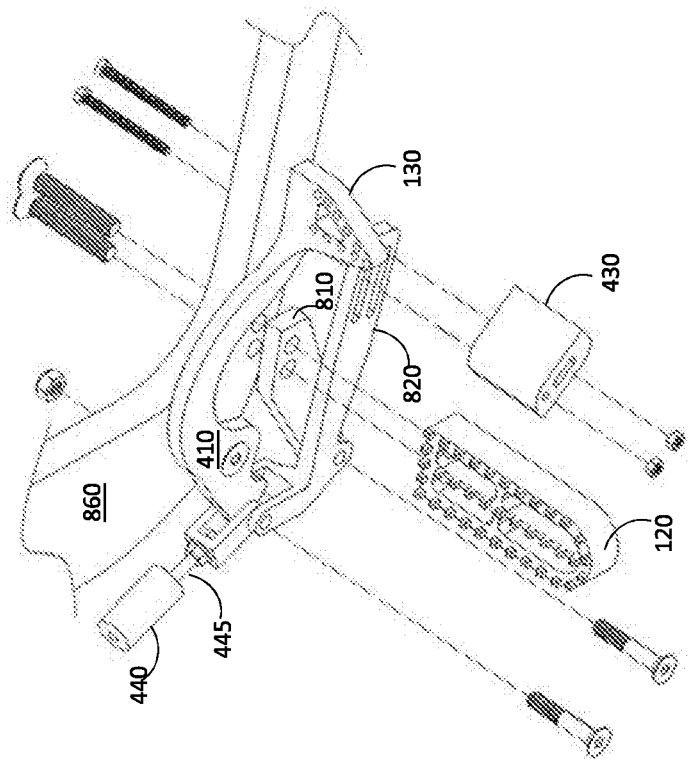
FIG. 9 is an exploded perspective view of the motorcycle the brake-lever extension of FIG. 9 depicting connection with a motorcycle frame and existing brake actuation hardware; according to an embodiment.

FIG. 8 is a perspective side-view of a second embodiment of a motorcycle rear-brake adaptor unit 400 including an adapted rear-brake lever implemented as a brake-lever extension 820 pivotally mounted to bracket 810 with step-plate 430. Attachment of bracket 810 to motorcycle frame 860, foot peg 120 to bracket 810, and lower step-plate 430 to brake-lever extension 820 are shown in the exploded view of FIG. 9. Also shown in FIG. 9 is the interface between pivotally mounted brake-lever extension 820 with push rod 445 such that rod 445 can be advantageously driven by either motorcycle lever 410 or brake-lever extension 820 upon application of pressure to the respective step plate.

Figure 10:
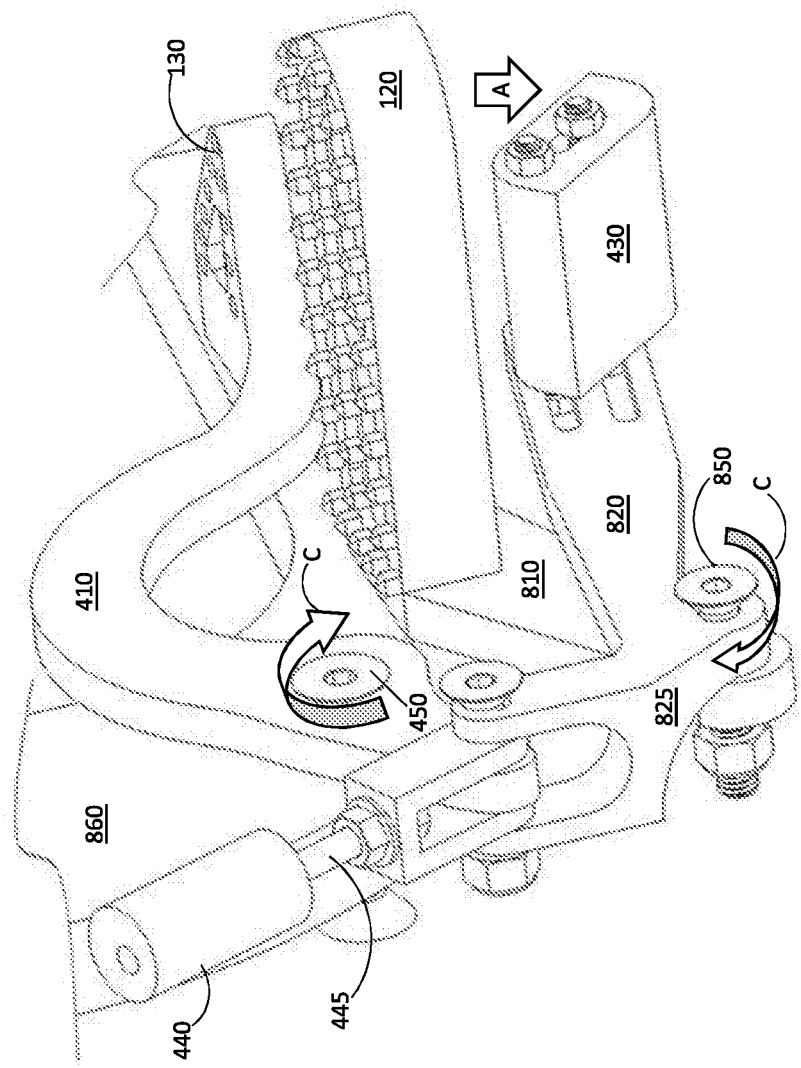
FIG. 10 is a perspective rear-view of the brake-lever extension of FIG. 10 in a deployment state; according to embodiment.

FIG. 10 is a perspective rear-view of the brake-lever extension embodiment of motorcycle rear-brake adaptor unit during operation. As shown, pressure A applied to lower step-plate 430 brake-lever extension 820 around pivotal mount 850 and also rotates lever 410 around pivotal mount 450 as depicted by arrows C.

In a certain embodiment, brake-lever extension 820 is implemented as two lever elements, 825 and 820 that releasable interlock at chosen angle in accordance with rider needs.

Figure 11:
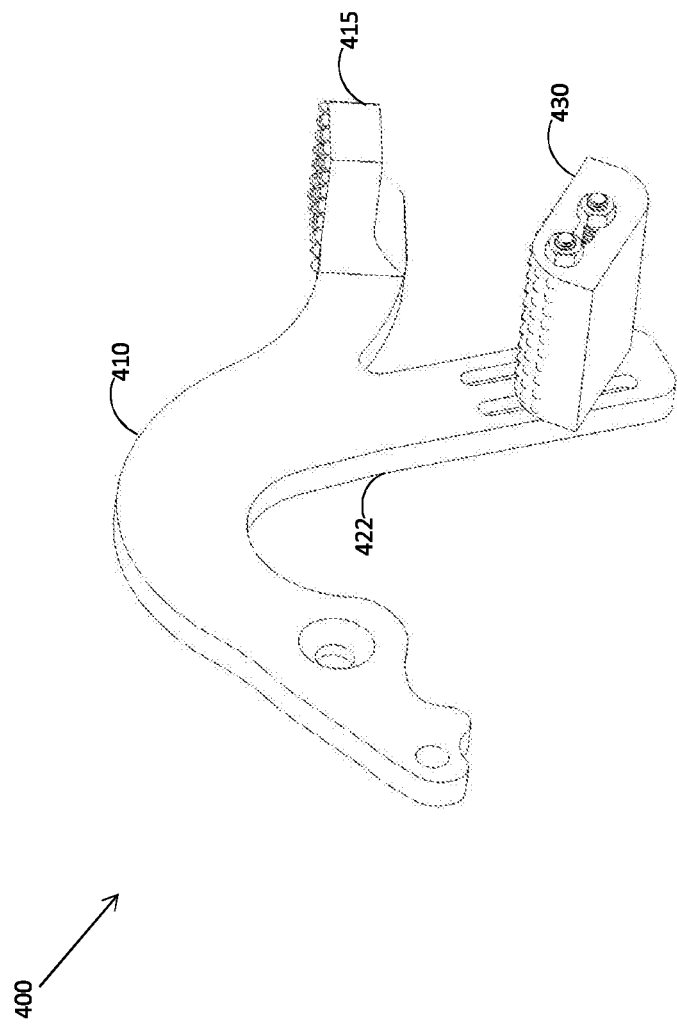
FIG. 11 is a perspective side-view of a rear-brake adaptor unit implemented integrally with the motorcycle brake lever; according to an embodiment.

FIG. 11 is a perspective side-view of rear-brake adaptor unit 400 including an adapted rear-brake lever implemented as an integral lever extension 422; according to an embodiment.

As shown, integral lever extension 422 extends directly from brake lever 410 and provides brake access when riding posture is non-conducive to use of step-plate 415 as noted above. This embodiment also employs configurable lower step-plate 430. In a certain variant embodiment, adapted step-plate 415 is implemented in the absence of adaptations.

Figure 12:
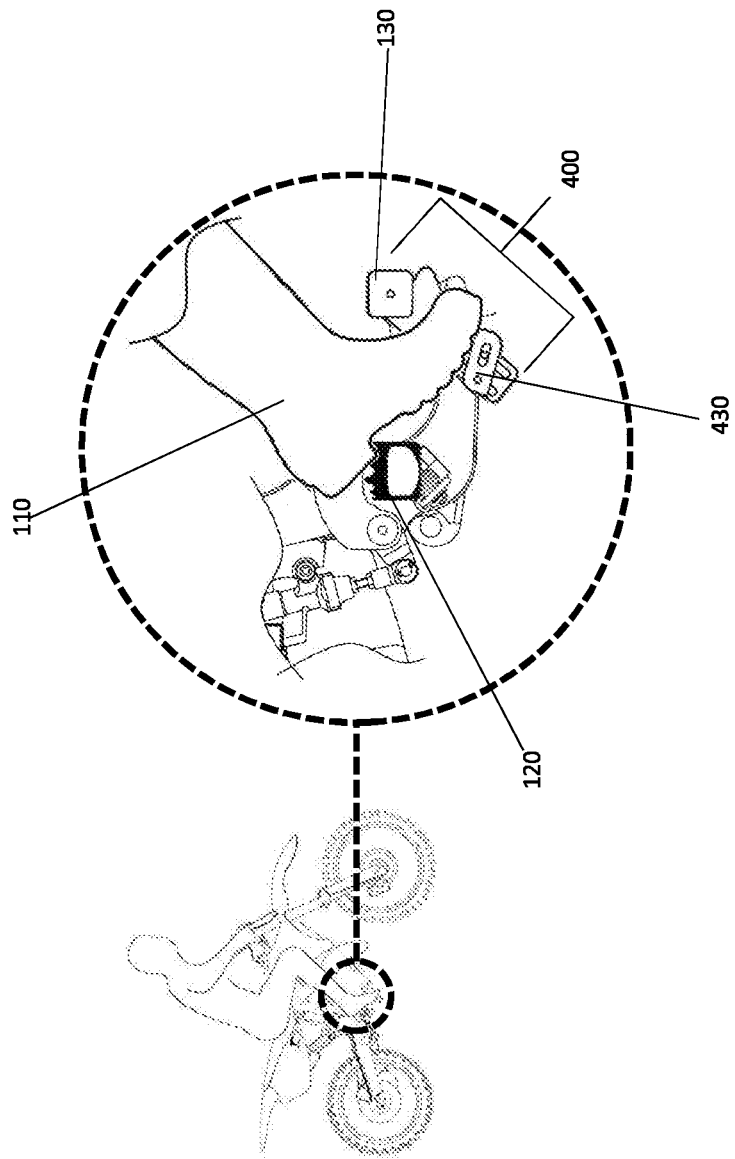
FIG. 12 is a schematic depiction of highlighting constant access to a brake pedal foot posture enabled by the brake adaptation unit; according to an embodiment.

FIG. 12 is a schematic depiction of a rider utilizing the brake adaptation unit 400 to maintain constant contact with a step-plate 430 while foot 110 rests on foot peg 120 to advantageously negate the danger and discomfort associated with holding the foot above upper step-plate 130 as necessitated by the various riding postures noted above.

Motorcycle rear-brake adaptor unit is constructed from aluminum, metallic alloys, polymeric materials, or a combination as employed in the construction of motorcycle brake levers. Known constructions methods like machining, casting, forging, or printing, for example, are all suitable construction methods.

It should be appreciated that embodiments formed from combinations of features set forth in separate embodiments are also within the scope of the present invention.

While certain features of the invention have been illustrated and described herein, modifications, substitutions, and equivalents are included within the scope of the invention.

What is claimed is:

1. A motorcycle, rear-brake adaptor unit comprising:
   a rear-brake lever in communication with a rear brake hydraulic master cylinder;
   a step-plate connected to the rear-brake lever;
   one foot peg; and
   a lower step-plate in operative communication with the rear-brake lever, the lower step-plate disposed in a position behind the step-plate in a plane lower than the step-plate, the position providing simultaneous foot access to both the step-plate and the lower step-plate when a rider foot is resting on the one foot peg.

2. The motorcycle, rear-brake adaptor unit of claim 1, further comprising a step-plate extension connecting the step-plate and the lower step-plate.

3. The motorcycle, rear-brake adaptor unit of claim 2, wherein the step-plate is implemented as an adapted step-plate facilitating rotation of the step-plate extension within the adapted step-plate.

4. The motorcycle, rear-brake adaptor unit of claim 3, wherein the step-plate extension is releasably mounted to the adapted step-plate so as to form an angle between 10°-70° relative to the horizontal.

5. The motorcycle, rear-brake adaptor unit of claim 3, wherein the step-plate extension is releasably mounted to the adapted step-plate so as to form an angle between 20°-50° relative to the horizontal.

6. The motorcycle, rear-brake adaptor unit of claim 3, further comprising a spring arrangement configured to bias the step-plate extension into a deployment position.

7. The motorcycle, rear-brake adaptor unit of claim 6, wherein the spring arrangement includes a coil torsional spring.

8. The motorcycle, rear-brake adaptor unit of claim 7, further comprising a detent mechanism configured to releasably secure the step-plate extension in a non-deployment position.

9. The motorcycle, rear-brake adaptor unit of claim 6, wherein the spring arrangement includes a compression spring.

10. The motorcycle, rear-brake adaptor unit of claim 2, wherein the lower step-plate is securable in any one of a plurality of longitudinal positions within the step-plate extension in accordance with a connection configuration of the step-plate extension.

11. The motorcycle, rear-brake adaptor unit of claim 10, wherein the lower step-plate is securable in any one of a plurality of orientations in accordance with the connection configuration of the step-plate extension.

12. The motorcycle, rear-brake adaptor unit of claim 1, further comprising a brake-lever extension connecting the rear-brake lever and the lower step-plate.

13. The motorcycle, rear-brake adaptor unit of claim 12, wherein the lower step-plate is securable in any one of a plurality of positions within the brake-lever extension in accordance with a connection configuration of the brake-lever extension.

14. The motorcycle, rear-brake adaptor unit of claim 12, wherein the lower step-plate is securable in any one of a plurality of orientations in accordance with a connection configuration of the brake-lever extension.

15. A motorcycle, rear-brake adaptor unit comprising:
a rear-brake lever in communication with a rear brake hydraulic master cylinder;
a step-plate connected to the rear-brake lever;
a lower step-plate;
a step-plate extension connecting the step-plate and the lower step-plate,
wherein the lower step-plate is disposed in a position accessible to a downwardly sloping, rider foot resting on a foot peg,
wherein the step-plate is implemented as an adapted step-plate facilitating rotation of the step-plate extension within the adapted step-plate; and
a limiter bolt configured to define a maximum deployment angle of the step-plate extension.

16. A motorcycle, rear-brake adaptor unit comprising,
a motorcycle rear-brake lever in communication with a rear master brake cylinder;
a step-plate mounted to the motorcycle rear-brake lever;
an integral lever extension integrally connected to the motorcycle rear-brake lever;
one foot peg; and
a lower step-plate mounted to the integral lever extension, the lower step-plate disposed in a position behind the step-plate in a plane lower than the step-plate, the position providing simultaneous foot access to both the step-plate and the lower step-plate when a rider foot is resting on the one foot peg.

17. The motorcycle, rear-brake adaptor unit of claim 16, wherein the lower step-plate is securable in any one of a plurality of positions within the integral lever extension in accordance with a connection configuration of the integral lever extension.

18. The motorcycle, rear-brake adaptor unit of claim 16, wherein the lower step-plate is securable in any one of a plurality of orientations in accordance with a connection configuration of the integral lever extension.

* * * * *